March 21, 1967     T. H. KLUNE     3,310,095

TIRE REPAIR MEANS

Filed Aug. 10, 1964     2 Sheets-Sheet 1

Thomas H. Klune,
INVENTOR.

WHANN & McMANIGAL
Attorneys for Applicant by Robert M. McManigal

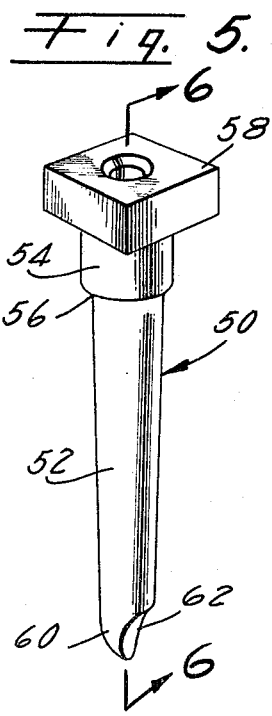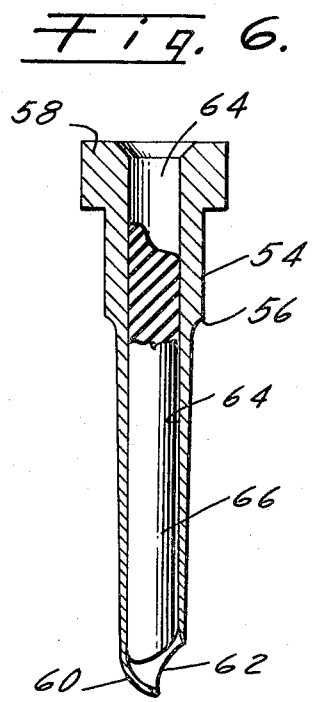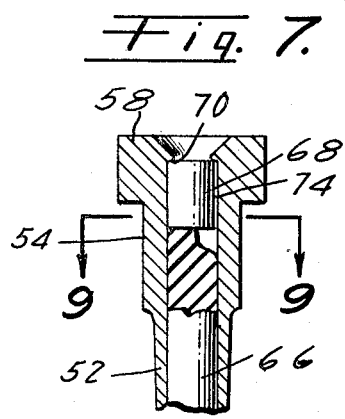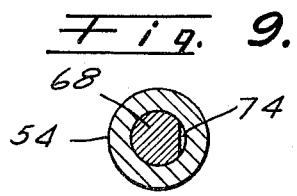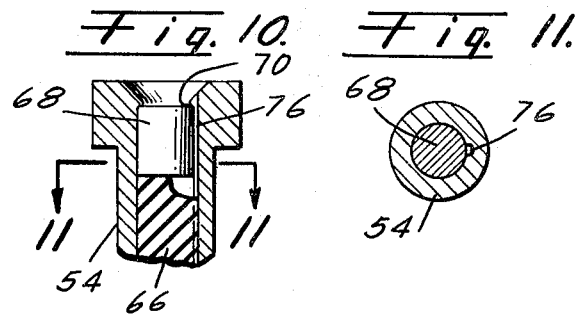

3,310,095
TIRE REPAIR MEANS
Thomas H. Klune, 12105 Gothic,
Granada Hills, Calif. 91344
Filed Aug. 10, 1964, Ser. No. 392,963
12 Claims. (Cl. 152—370)

This invention relates generally to devices for the repair of pneumatic tires, and relates more particularly to devices for the repair of pneumatic tires of the tubeless type. This is a continuation-in-part of my co-pending application, Ser. No. 82,793, filed Jan. 16, 1961, for Tube Patching Means, now abandoned.

While the invention has particular utility in connection with the repair of pneumatic tires of the tubeless type, and is shown and described in such connection, it is to be understood that its utility is not confined thereto.

Certain problems are involved in the repair of punctures and the like in tubeless tires, particularly in the repair of such tires without removing same from the wheels on which they are mounted. In making such repairs, rubber plugs of various types are used to seal the puncture openings through the tires. Usually punctures are made by relatively small objects such as small nails or the like, so that the actual opening through the tire is therefore relatively small. Considerable difficulty has been encountered in the installation of the rubber plugs in such puncture openings because of such small size thereof.

In one of the present methods of repairing puncture openings in tubeless tires a rubber plug is disposed under compression in a metal tube which is forced into the puncture opening and then the plug is forced out of the tube as the latter is pulled from the puncture opening, leaving the plug in the opening. However, because of the small size of the usual puncture opening and the relatively large diameter of the metal tube, the puncture hole must be reamed out to a larger size and the metal tube forced into the tire. Even with the reamed out opening a great deal of force is required to get the metal tube into the opening, and it is an object of the present invention to provide a repair tube that will overcome the various difficulties and problems of equipment now on the market of which I am aware.

Another object of the invention is to provide such a tube that requires substantially less force to get it into a puncture opening.

It has also been found that in many cases the tubes heretofore used the rubber plug therein sticks to or freezes in the metal tube, particularly if left in the tube for a considerable length of time, and it is almost impossible to force the repair plug from the tube.

It is therefore still another object of the present invention to solve this problem and overcome the difficulties thereof.

A further object of the invention is to provide an improved tubular repair device in which a plug of resilient elastic material, such as rubber (natural or synthetic) or the like, is disposed in an extended or stretched condition, preparatory to installation in a puncture opening in a tire.

Still another object of the invention is to provide a repair device or tube readily insertable into a puncture opening in a tire.

A further object of the invention is to provide a device of this character having means for facilitating the forcing of the rubber plug material form the tube to effect sealing of the puncture hole therein.

A still further object of the invention is to provide a tube of this character wherein the possibility of splitting said tube when forcing the rubber material therefrom is reduced to a minimum.

Another object of the invention is to provide a tube of this character having means for securely attaching same to a tool used to insert said repair tube into the puncture opening.

A further object of the invention is to provide a tube of this character that may be produced in large quantities with automatic machinery.

A further object of the invention is to provide a device of htis character that is relatively inexpensive to manufacture or produce.

In repair tubes for this purpose it has been found that the outer end of the rubber plug is uneven and if the plunger for forcing said plug from the repair tube does not have a close fit within the passage through the tube the uneven end of the plug will wedge about the plunger or the applicator and cause binding thereof and splitting of the tube.

It is, therefore, still another object of the invention to provide a device of this character that will overcome this difficulty.

Another object of the invention is to provide a repair tube of this character that has a somewhat pointed bullet nose while still having an opening in the forward end of the tube for extrusion of the plug.

Still another object of the invention is to provide a repair device of this character that has a relatively small forward end portion for insertion into the puncture opening.

A further object of the invention is to provide a device of this character that is strong and not subject to bending or collapsing.

A further object of the invention is to provide a device of this character having pressure means engageable by the plunger of the application that will force the rubber plug from the tube without binding even though the plunger of the applicator is substantially smaller in diameter than the inside diameter of the tube.

Another object of the invention is to provide a device of this character that will permit various sized tubes to be used with an applicator without causing binding of the applicator plunger therein.

Still another object of the invention is to provide a device of this character wherein there is a pressure plug of somewhat harder material than the rubber plug but which is somewhat plastic so that it will be readily movable in the repair tube even when the passage therein is tapered and gradually becomes smaller toward the forward end.

A further object of the invention is to provide a device of this character having means to prevent the pressure plug from becoming displaced or coming out of the adjacent end of the repair tube.

A still further object of the invention is to provide a device of this character having means for preventing tilting of the pressure plug in the tube.

Another object of the invention is to provide a device of this character having vent means to prevent pressure building up between the outer end of the rubber plug and the pressure plug when the latter is installed in the repair tube.

Still another object of the invention is to provide a device of this character wherewith tires may be repaired without removing them from their wheels.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, elements, or modes of operation that are properly within the scope of the appended claims.

Referring to the drawings, which are for illustrative purposes only:

FIG. 5 is a perspective of a tire repair device embodying the present invention;

FIG. 6 is a sectional view taken on line 6—6 of FIG. 5, before installation of the pressure plug;

FIG. 7 is a longitudinal sectional view of the upper end of a repair device after installation of the pressure plug;

FIG. 8 is a view of the flanged outer end of the device with the pressure plug installed;

FIG. 9 is a sectional view taken on line 9—9 of FIG. 7;

FIG. 10 is a longitudinal sectional view of the upper or outer end portion of an alternative arrangement; and FIG. 11 is a sectional view taken on line 11—11 of FIG. 10.

Figure 1:
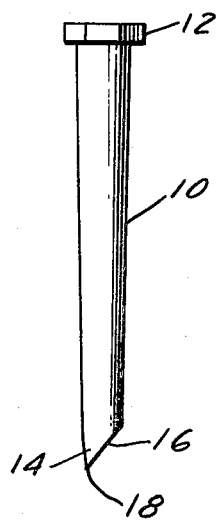
FIG. 1 is a side view of a repair device embodying the present invention.
Figure 2:
FIG. 2 is a top plan view of the same.

Referring more particularly to the drawings there is shown a repair device comprising an elongated tube 10 of suitable material such as, for example, cast aluminum, pot metal or the like. The tube 10 has a radially flanged head 12 which may be multi-sided, the head shown being hexagonal, although it may have a different number of sides.

The tube tapers from the head 12 so that the end thereof opposite the head is somewhat smaller in diameter. At the smaller end of the tube said tube has an end portion 14 with a rounded taper somewhat greater than the taper of the rest of the tube. At one side the end portion 14 is cut on a bevel, as at 16, to provide a relatively sharp point 18 to facilitate insertion of the tube into a tire.

The interior passage 20 of the tube 10 is also tapered from the headed end of the tube to the smaller diameter end and disposed within said passage or bore is a piece of suitable elastic, resilient material 22, such as rubber or the like. The material 22 comprises the sealing plug for sealing the puncture opening in the tire. The plug is normally cylindrical and of greater diameter than the diameter of the passage 22 of the repair tube 10 and is disposed in said passage in a longitudinally extended stretched or compressed condition so as to fill a substantial part of the passage 20. The outer end of the plug 22 is spaced inwardly of the outer end of the tube to thereby provide a space 26.

Within the space 26 is a pressure plug 28 of a somewhat hard but pliable material, such as, for example, zinc, certain types of pot metal, plastic material of suitable characteristics, or lead. The purpose of the plug 28 is to provide a piston-like member against which pressure may be applied by means of a rod 30 of an applicator device or tool indicated generally at 32.

In the repair of a puncture opening 34 in a tire 36, the tube 10 is forced into said opening 34 by means of the applicator tool 32 to a point whereat the inner end 38 of said tool 32 engages the adjacent surface 40 of the tire wall 36.

When the applicator tool 32 is operated the tube 10 is pulled outwardly from the tire 36 and the rod 30 engages the plug 28 to hold it against outward movement as the tube 10 is pulled outwardly by the applicator tool 32. As the tube 10 is pulled outwardly after the rod 30 engages the plug 28, the material 22 in the passage 20 of the tube 10 is forced outwardly of the small end of said tube, leaving the end portion 24 thereof at the side 44 of the tire wall, opposite the side 40 thereof.

The pressure plug 28 fits snugly but slidably in the passage 20 and being pliable is reduced in size as it is forced through the passage 20 toward the smaller end thereof, it being understood that said pressure plug 28 is of sufficient hardness so that the rod 30 will not be forced into or through said plug 28 under the forces involved.

When the tube 10 is fully removed from the puncture opening 34 the pressure plug 28 has forced the sealing plug 22 from the smaller end of the passage 20 of tube 10 and there will remain an end portion at the outer side 40 of the tire wall similar to the portion 24 at the inner side of said tire. The portion 24, and the comparable portion at the outer side of the tire, are of the normal size or diameter of the sealing plug, whereas the portion of the sealing plug disposed in the puncture opening 34 is squeezed therein and forms an airtight relationship with the tire so that the tire is satisfactorily repaired against the loss of air.

Referring to the arrangement shown in FIGS. 5 to 9, the alternative arrangement comprises a tube, indicated generally at 50, which may be of the same material as the tube described above. It may, of course, be die cast.

This tube comprises a main portion 52 which may be tapered as shown and described herein or may be a straight cylinder. At what will be termed the outer or larger end there is an enlarged diameter collar 54 which is shown as cylindrical although it could, of course, be tapered also toward the outer or larger end, there being a shoulder 56 at the inner end of the collar where it joins the portion 52 and this should serve to limit inward movement of the tube in a puncture opening or the like in the tubeless tire or tire casing. The collar 54 also serves as a strengthening element for the outer end portion of the tube.

At the outer end of the tube there is a head 58 similar to the head 12 of the arrangement shown in FIGS. 1 to 4. Head 58 is shown as being square but it may, of course, be of other shape. The purpose of the head is to provide means for attachment to or connection with an applicator tool.

The forward end of the tube is provided with a bullet shaped penetration end or nose 60 which provides a smooth surfaced leading end which may be forced into the puncture opening after it has been reamed out in the usual well known manner, with relative ease. The solid wall portion of the bullet nose extends over the axis of the tube and there is a discharge opening 62 at one side of said axis.

Tube 50 has an interior passage 64 therethrough which may be either straight walled or tapered as desired. At its forward end the passage curves toward the opening 62.

Figure 3:
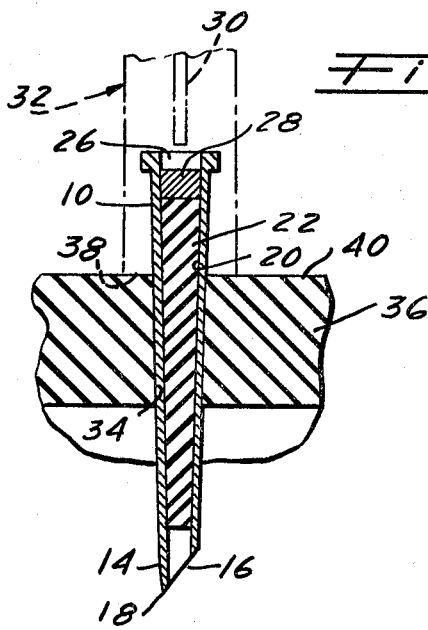
FIG. 3 is a sectional view showing the tube inserted in a puncture opening in a tire before the rubber in the repair tube has been forced therefrom.
Figure 4:
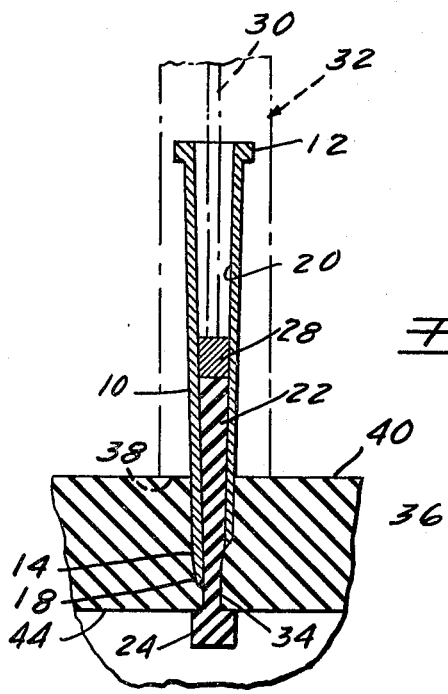
FIG. 4 is a similar view but showing the repair tube partially removed from the puncture opening and the resilient, elastic sealing plug partly forced from said repair tube.

Within the passage 64 there is an elongated slug or piece of material 66 that is resilient and expandable as the material 22 shown in FIGS. 3 and 4.

It is to be noted that the outer end of the slug of material is spaced inwardly of the outer end of the passage 64 of the tube.

In the outer end portion of the passage 64 there is a plug or piston 68 of any suitable material such as that of the plug 28 in the arrangement of FIGS. 1 to 4. This plug is snugly fitted in the passage 64 and is of harder material than the material 66 but is sufficiently soft and/or pliable so that it will compress as it is pushed through the passage 64 when such passage is tapered. If the passage is not tapered the plug will nevertheless be sufficiently hard so that the plunger of an applicator will not be forced through said plug when the plug is forced forwardly in passage 64 to force the material 66 out of the discharge or outlet opening 62 in the bullet shaped nose 60.

As stated above the plug may be of any suitable material, lead having been found to be an excellent material therefor as pointed out hereinabove as to the plug 28. As with the latter, other materials may be used.

The plug thus provides a relatively hard though pliable piston and makes it unnecessary for the plunger of the applicator to be of substantially the same diameter as the passage through the tube. This is an important feature where the passage through the tube is tapered and becomes smaller toward the forward end. Also, one size of applicator may be used to handle tubes of several sizes.

Often the outer end of the material 66 is irregular in shape and will tend to exert tilting pressure on the plug 68. Also, to prevent the plug 68 from being forced out of the outer end of the tube passage, a small fin or flange 70 is formed at the outer end of the passage 64 which securely retains said plug 68 in operative position in passage 64. This flange 70 is formed at the inner end of a flared end portion 72 at the outer end of the passage 64. This flared end portion facilitates assembly of the device.

In order to prevent creation of undesirable air pressure between the outer end of the material or slug 66 and the plug 68 pressure relief means is provided. In the arrangement shown in FIGS. 7 and 8 one side of the plug 68 is relieved, as shown at 74. In the arrangement shown in FIGS. 10 and 11 there is a groove 76 formed in the wall of the tube. Other arrangements may, of course, be used to relieve this pressure such as a longitudinal passage through the plug 68.

The operation of the arrangement shown in FIGS. 5 to 11 is substantially the same as that shown in FIGS. 1 to 4.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and I do not wish to be restricted to the specific forms shown or uses mentioned except as defined in the accompanying claims, wherein various portions have been separated for clarity of reading and not for emphasis.

I claim:
1. A tire repair device, comprising:
 (A) an elongated metallic tube tapering slightly from one end to the other and having a passage therethrough with a corresponding taper;
 (B) a radial, flange-like head at the larger end of said plug, said head having a plurality of sides for releasable connection with an applicator tool;
 (C) an end portion at the smaller end of said tube, said end portion having curved taper slightly greater than the rest of the tube and having one side beveled to provide a penetrating point at the free tip of said end portion;
 (D) elastic, resilient material disposed within the passage through the tube and constituting a sealing plug, said sealing plug being in a stretched condition within said passage and extrudable from the small end of the passage into a puncture opening or the like through the wall of a tire and expandable where not confined within said puncture opening; and
 (E) a pressure plug of pliable material disposed in said passage and engageable with the end of the sealing plug adjacent the larger end of the tube, said pressure plug being of harder material than said sealing plug.

2. A tire repair device, comprising:
 (A) an elongated metallic tube tapering slightly from one end to the other and having a similarly tapering passage therethrough;
 (B) a radial flange-like head at one end for releasable connection with an applicator tool;
 (C) an end portion at the smaller end of said tube, said end portion having a taper slightly greater than the rest of the tube and having one side beveled to provide a penetrating point at the tip of said end portion;
 (D) a sealing plug of elastic, resilient, material disposed within the passage through the tube in stretched condition and extrudable from the small end of the passage; and
 (E) and a pressure plug of pliable material disposed in the larger end of said passage.

3. A tire repair device, comprising:
 (A) an elongated tube of stiff material tapering slightly from one end to the other and having a similarly tapered passage therethrough;
 (B) a radial flange-like head at one end having a plurality of sides for releasable connection with an applicator tool;
 (C) an end portion having a taper slightly greater than the rest of the tube and having one side beveled to provide a penetrating point at the tip of said end portion;
 (D) elastic, resilient material compressed within the passage through the tube and expandable upon extrusion from said passage; and
 (E) a pressure plug of pliable material disposed in the larger end portion of said passage.

4. A tire repair device, comprising:
 (A) an elongated tube of stiff material tapering slightly from one end to the other and having a similarly tapered passage therethrough;
 (B) a radial flange-like head at one end having a plurality of projections for releasable connection with an applicator tool;
 (C) an end portion at the smaller end of said tube, said end portion having a taper slightly greater than the rest of the tube and having one side beveled to provide a penetrating point at the tip of said end portion; and
 (D) an elastic, resilient material compressed within the passage through the tube and expandable upon extrusion from said passage.

5. In a tire repair device:
 (A) an elongated tube of stiff material, having a passage therethrough;
 (B) a radial flange-like head at one end having a plurality of projections for releasable connection with an applicator tool;
 (C) a portion at the end of said tube opposite the head having one side beveled to provide a penetrating point at the tip of said end portion;
 (D) elastic, resilient material compressed within the passage through the tube and expandable upon extrusion from said passage; and
 (E) a pressure plug of pliable material harder than said resilient material disposed in the end portion of said passage terminating at the end of the tube having the head.

6. In a tire repair device:
 (A) an elongated tube of stiff material having a passage therethrough;
 (B) a head at the outer end of said tube for releasable attachment to an applicator tool;
 (C) resilient material compressed within the passage through the tube;
 (D) and a pliable pressure plug of harder material than said expandable material disposed in the outer end portion of said passage terminating at the end of the tube having the head,
 (E) there being passage means for relief of pressure between the plug and adjacent end of the expandable material.

7. The invention defined by claim 6, including means for holding the pressure plug against displacement from the tube.

8. In a tire repair device (A) an elongated tube of stiff material having a passage therethrough;
(B) a head at the outer end of said tube for releasable attachment to an applicator tool;
(C) resilient material compressed within the passage through the tube;
(D) a pliable pressure plug of harder material than said expandable material disposed in the outer end portion of said passage terminating at the end of the tube having the head;
(E) and a flange extending inwardly of the passage through the tube at the outer end of the pressure plug.

9. In a tire repair device:
(A) an elongated tube of stiff material having a passage therethrough;
(B) a head at the outer end of said tube for releasable attachment to an applicator tool;
(C) resilient material compressed within the passage through the tube;
(D) a pliable pressure plug of harder material than said expandable material disposed in the outer end portion of said passage terminating at the end of the tube having the head;
(E) and means for holding the pressure plug against movement of said plug outwardly of the outer end portion of said tube.

10. In a tire repair device:
(A) an elongated tube of stiff material having a passage therethrough;
(B) a head at the outer end of said tube for releasable attachment to an applicator tool,
(C) the end of said tube opposite the head being bullet-shaped, said bullet-shaped end being closed at the axis of the tube, there being a discharge opening at one side of said bullet-shaped end;
(D) resilient material within the passage through the tube;
(E) and a pliable pressure plug of harder material than said expandable material disposed in the outer end portion of said passage terminating at the end of the tube having the head.

11. In a tire repair device:
(A) an elongated tube of stiff material having a passage therethrough;
(B) a head at the outer end of said tube for releasable attachment to an applicator tool;
(C) resilient material compressed within the passage through the tube;
(D) and a pliable plug of harder material than said expandable material disposed in the outer end portion of said passage terminating at the end of the tube having the head,
(E) said pressure plug having a relieved part for relief of pressure between said plug and the adjacent end of the expandable material when the device is assembled.

12. A tire repair device, comprising:
(A) an elongated tube of stiff material tapering slightly from one end to the other and having a similarly tapered passage therethrough;
(B) a head at the larger end for releasable connection with an applicator tool;
(C) a bullet-shaped end portion at the smaller end of said tube to provide a penetrating point at the forward end of said tube, said bullet-shaped end portion having a discharge side opening;
(D) elastic, resilient material compressed within the passage through the tube and expandable upon extrusion from said passage through said discharge opening; and
(E) a pliable pressure plug of harder material than said elastic resilient material, said pressure plug being disposed in said passage behind said elastic resilient material.

References Cited by the Examiner

UNITED STATES PATENTS 2,724,385  11/1955  Lockhart _____ 222—386 X

FOREIGN PATENTS 569,894  8/1958  Belgium.

ARTHUR L. LA POINT, *Primary Examiner.*

EUGENE G. BOTZ, *Examiner.*

G. W. HAEFELE, *Assistant Examiner.*